(12) United States Patent
Scheibelhoffer et al.

(10) Patent No.: US 7,026,391 B2
(45) Date of Patent: Apr. 11, 2006

(54) POLYMER COMPOSITIONS COMPRISING POLYOLEFINS AND REACTION PRODUCTS OF A POLYOLEFIN AND AN UNSATURATED CARBOXYLIC REAGENT AND ARTICLES MADE THEREFROM

(75) Inventors: Anthony S. Scheibelhoffer, Norton, OH (US); Deenadayalu Chundury, Newburgh, IN (US); Gerald W. Drabeck, Akron, OH (US); Timothy W. Birch, Ravenna, OH (US); Dennis L. Hammond, Richfield, OH (US)

(73) Assignee: Ferro Corporation, Cleveland, OH (US)

( * ) Notice: Subject to any disclaimer, the term of this patent is extended or adjusted under 35 U.S.C. 154(b) by 586 days.

(21) Appl. No.: 10/041,056

(22) Filed: Jan. 7, 2002

(65) Prior Publication Data

US 2003/0004245 A1    Jan. 2, 2003

Related U.S. Application Data

(63) Continuation of application No. 09/037,464, filed on Mar. 10, 1998, now abandoned.

(51) Int. Cl.
*C08K 3/00* (2006.01)

(52) U.S. Cl. ............... 524/515; 524/425; 524/522; 524/523

(58) Field of Classification Search ............... 524/515, 524/425, 522, 523
See application file for complete search history.

(56) References Cited

U.S. PATENT DOCUMENTS

| | | | |
|---|---|---|---|
| 4,477,617 A | 10/1984 | Murphy | |
| 5,473,016 A * | 12/1995 | Fujii et al. | 525/74 |
| 5,593,764 A | 1/1997 | Guerdoux et al. | |

* cited by examiner

*Primary Examiner*—Edward J. Cain
(74) *Attorney, Agent, or Firm*—Rankin, Hill, Porter & Clark LLP

(57) ABSTRACT

This invention relates to a polymer composition comprising (A) from about 55% to about 75% by weight of at least one polyolefin, (B) from about 2% to about 12% by weight of at least one reaction product of an alpha, beta unsaturated carboxylic reagent and a polyolefin, and (C) from 15% to about 35% by weight of filler. In one aspect, the polymer compositions also include (D) at least one copolymer of ethylene and an olefin, (E) at least one polyamide, or (F) a mixture of (D) and (E). These compositions provide articles and films with improved scratch resistance and hardness. These compositions have improved processing character because their low coefficient of friction.

22 Claims, No Drawings

POLYMER COMPOSITIONS COMPRISING POLYOLEFINS AND REACTION PRODUCTS OF A POLYOLEFIN AND AN UNSATURATED CARBOXYLIC REAGENT AND ARTICLES MADE THEREFROM

This is a continuation of application Ser. No. 09/037,464, filed Mar. 10, 1998, now abandoned.

FIELD OF THE INVENTION

This invention relates to polymer blends, specifically blends of a polyolefin, such as polypropylene, and a reaction product of a polyolefin and an alpha, beta unsaturated carboxylic ester, acid or anhydride, such as acrylated or maleated polypropylene. These compositions also include calcium carbonate.

BACKGROUND OF THE INVENTION

Polypropylene is a preferred material for use in forming plastic articles. However, a problem with polypropylene is its general surface softness, especially its susceptibility to scratching. Resins having harder surface character are often added to polypropylene to improve its toughness. When these resins are added, however, they are often not found on the surface of the articles formed from the polymer blends. It is desirable to have polyolefin compositions which have good surface hardness and have improved toughness, especially improved scratch resistance.

U.S. Pat. No. 5,230,963, issued to Knoerzer, relates to oxygen and water vapor transmission resistant film and methods of making the same. The film is a combination of base layers each of which is a blend of polypropylene and maleated polypropylene. Each of the layers receive a coating of polyvinyl alcohol and a crosslinking agent.

U.S. Pat. No. 5,248,364, issued to Liu et al, relates to polypropylene laminates and processes for the production thereof. The laminate contains a layer composed of a blend of maleated high molecular weight polypropylene and a low density polyethylene.

U.S. Pat. No. 5,281,670, issued to Lee et al, relates to polyolefin compositions. The compositions comprise a blend of polybutylene and a functionalized polyolefin, such as maleated polypropylene.

SUMMARY OF THE INVENTION

This invention relates to a polymer composition comprising (A) from about 35% to about 75% by weight of at least one polyolefin (B) from about 2% to about 12% by weight of at least one reaction product of an alpha, beta unsaturated carboxylic reagent and at least one polyolefin, and (C) from 5% to about 40% by weight of filler. In one aspect, the polymer compositions include (D) a copolymer of ethylene and an olefin, (E) at least one polyamide, or (F) a mixture of (D) and (E). In another aspect, (A) is a combination of (i) a low melt flow polyolefin and (ii) a high melt flow polyolefin. These compositions provide articles and films with improved scratch resistance and hardness. These compositions have improved processing character because of their low coefficient of friction.

DETAILED DESCRIPTION OF THE INVENTION

As described above the present invention relates to polymer composition which includes, as a first component, a polyolefin or mixture thereof. In one embodiment, the polyolefin is present in an amount from about 35% to about 80%, or from about 45% to about 75%, or from about 50% to about 70% by weight. Here as well as elsewhere in the specification and claims, the range or ratio limits may be combined.

The polyolefins typically have a melt flow from about 4 to about 15, or from about 5 to about 12, or from about 6 to about 10 g/10 min. The melt flow is determine by standard methods and is in units of grams per ten minutes. In one embodiment, component (A) is a combination of (i) a low melt flow polyolefin and (ii) a high melt flow polyolefin. Typically, (i) has a melt flow from about 1.5 to about 6, or from about 2 to about 5, or from about 2.5 to about 4 g/10 min. Polyolefin (ii) generally has a melt flow from about 8 to about 18, or from about 9 to about 16, or from about 10 to about 14 g/10 min. When the polyolefin (A) is a combination of (i) and (ii), then (i) is generally present in an amount from about 20% to about 50%, or from about 25% to about 45%, or from about 30% to about 42% by weight. Component (ii) is typically present in an amount from about 50% to about 80%, or from about 55% to about 75%, or from about 58% to about 70% by weight.

The number average molecular weight of the polyolefins is preferably above about 10,000 and more preferably above about 50,000. In addition, it is preferred in one embodiment that the apparent crystalline melting point be above about 75° C. and preferably between about 80° C. and about 250° C.

The polyolefins generally are semi-crystalline or crystallizable olefin polymers including homopolymers, copolymers, terpolymers, or mixtures thereof. The polymers are prepared from olefins, which typically contain from about 2 to about 20, or from about 2 to about 8, or from about 2 to about 6 carbon atoms. The polyolefins may be derived from olefins such as ethylene, propylene, 1-butene, 1-pentene, 4-methyl-1-pentene, 1-octene, 1-decene, 4-ethyl-1-hexene, etc., or mixtures of two or more of these olefins. Examples of particularly useful olefin polymers include low-density polyethylene, high-density polyethylene, linear low density polyethylene, ultra low density polyethylene, (high and low density) polypropylene (including isotactic polypropylene), (high and low density) poly(1-butene), poly(4-methyl-1-pentene), ultra low molecular weight polyethylene, ethylene-based ionomers, poly(4-methyl-1-pentene), ethylene-propylene copolymers, etc. Preferred polyolefins are polypropylene and propylene ethylene copolymers. The polyolefins useful in preparing the polymer blends of the present invention are well-known to those skilled in the art and many are available commercially. Examples of commercially available polyolefins include polypropylene homo- and copolymers such as Himont's Profax 6523 and 8623, Shell's 7C54H and 7C06 or Exxon's PP1012, PD 7132 and PD7163, or Aristech's 4040F.

Processes useful in preparing the propylene ethylene copolymers are well-known to those skilled in the art and many such copolymers are available commercially. Such random copolymers may be prepared by any of a number of methods known in the art including those set forth in the Encyclopedia of Polymer Science & Engineering, Vol. 13, 2nd edition, Wiley & Sons, pp. 500-et seq. (and footnotes cited therein), which is fully incorporated by reference herein. Propylene ethylene copolymers useful in the present invention are available commercially. Examples of these copolymers include Fina Y-8573 and Z-7650 available from Fina Oil and Chemical Company, Dallas, Tex., U.S.A and Soltex 4208 available from Soltex Polymer Corporation, Houston, Tex., U.S.A.

The polymer composition also include (B) a reaction of at least one polyolefin and an alpha, beta-unsaturated carboxylic acid reagent, such as an acid, ester or anhydride. The reaction product is present in a minor amount. In one embodiment, the reaction product is present in an amount from about 1% up to about 14%, or from about 2% to about 12%, or from about 4% up to about 10% by weight.

The polyolefins have been described above. In one embodiment, the number average molecular weight of the polyolefins utilized in this component may range from about 2000 to about 10,000. These polymers typically have a melt flow from about 8 to about 40, or from about 10 to about 35, or from about 15 to about 30 g/10 min. The amount of carboxylic acid reagent reacted with the polyolefin may range from about 0.5% to about 30% or from about 1% to about 20%, or from about 2% to about 15%, or from about 4% to about 10% by weight.

The alpha, beta unsaturated carboxylic reagent may be mono- or dicarboxylic acid reagent. The carboxylic reagents include carboxylic acids, esters, and salts. The monobasic alpha, beta-unsaturated carboxylic acid reagents include acrylic methacrylic, annamic, crotonic acids, esters, such as esters having from 1 to about 12 carbon atoms and salts such as sodium, calcium or magnesium. Examples of dicarboxylic reagents include maleic acid, maleic anhydride, fumaric acid, mesaconic acid, himic anhydride, itaconic acid, citraconic acid, itaconic anhydride, citraconic anhydride, monomethyl maleate, monosodium maleate, etc. A particularly preferred alpha, beta-unsaturated carboxylic reagent is acrylic acid, acrylic esters, and maleic anhydride.

The reaction between the carboxylic acid reagent in the polyolefin can be effected by means known to those skilled in the art. For example, the reaction can be conducted in solutions by a melt process in the presence of a free radical initiator. The free radical initiators usually are either peroxides or various organic azo compounds. The amount of initiator utilized generally from about 0.01% to about 5% by weight based on the combined weight of the olefin and the carboxylic reagent.

An example of acrylated polyolefins are the POLYBOND polymers available from Uniroyal Chemical Company. A particularly useful polymer is POLYBOND 1002, which has a melt flow of 15–25 g/10 min and an acrylic acid content 5.5% to 7.0% by weight. An example of a commercially available maleic acid grafted polypropylene is Epolene E-43 wax from Eastman Chemical Products, Inc. Epolene E-43 has an acid number of 47 and an approximate number average molecular weight of 4500. Epolene C-16 and C-18 waxes are maleic acid grafted polyethylenes with approximate molecular weights of 8000 and 4000, respectively. Maleated ethylene-propylene elastomers also are useful, and such elastomers are available from Exxon Chemical Company under identification numbers 99-10, 99-14 and 99-26. These copolymers contain 77%, 64% and 43% of ethylene, respectively, and the maleated products contain 0.76%, 0.56% and 0.35% of maleic acid or anhydride, respectively.

Other examples of commercially available maleic acid anhydride grafted polyolefins include Kraton FG1901X from Shell which is often referred to as a maleated selectively hydrogenated SEBS copolymer; terpolymers available from CdF Chimie under designations such as Lotader 3200 (prepared from a mixture of 88% by weight ethylene, 9% by weight butyl acrylate and 3% maleic anhydride), Lotader 6600 (70% ethylene, 27% acrylic ester and 3% maleic anhydride) etc.; ethylene vinyl acetate copolymers grafted with maleic anhydride (EVA-MAH) are available from Quantum Chemical Corp.

The polymer compositions also contain (C) a filler, such as calcium carbonate. The filler is present in a minor amount. The filler is typically present in an amount from 15% to about 50%, or from about 18% to about 45%, or from about 20% to about 40% by weight. Generally, the filler includes mineral powders used in polymer compositions and can include calcium carbonate, titanium dioxide, silica, alumina, mica, etc. A particularly useful filler is treated calcium carbonate sold under the tradename of Supercoat, available from E.C.C. International.

In one embodiment, the polyolefin compositions further comprise (D) at least one copolymer of ethylene and an olefin. Typically, (D) is present in an amount from about 1% to about 8% by weight. The olefin is typically, any of those described above. In one embodiment, the olefin has from 4 to about 10, or from about 6 to about 8 carbon atoms. Examples of the olefins include hexene, heptene, octene, nonene or decene. A preferred ethylene olefin copolymer is an ethylene octene copolymer available commercially from Dow Chemical Co. under the trade name Engage® 8100.

In one embodiment, the polyolefin compositions contain (E) at least one polyamide. The polyamide is present in an amount from about 1% up to about 8% by weight. The polyamides include a variety of polyamide resins including semi-crystalline and amorphous or transparent polyamides. These polyamide have been commonly referred to as nylons. The polyamide resins can be produced by condensation of equimolar amounts of a saturated dicarboxylic acid containing from 4 to 12 carbon atoms with a diamine in which the diamine contains from about 4 to about 16 carbon atoms. Alternatively, the dicarboxylic acids utilized to form the nylons may be aromatic dicarboxylic acids such as isophthalic acid or terephthalic acid. Examples of aliphatic saturated dicarboxylic acids include sebacic, octadecanoic acid, sebacic acid, azelaic acid, undecanedioic acid, glutaric acid, pimelic acid, and especially adipic acid.

Examples of diamines which can be reacted with dicarboxylic acids to form nylons include diamines such as tetramethylenediamine, pentamethylenediamine, octamethylenediamine, decamethylenediamine, hexadecamethylenediamine, and in particular, hexamethylenediamine. Examples of aromatic amines which can be utilized include para-phenylenediamine and 4,4'-diaminodiphenylsulfone.

Polyamide also can be produced by ring-opening polymerization of a cyclic lactam. Excess diamine can be employed to provide an excess of amine end groups over carboxyl end groups in the polyamide. Examples of specific polyamides include polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanoamide (nylon 6,12), the polyamide produced by ring opening of lactams such as polycaprolactam, polybutyrolactam, polypivalolactam, polylauric lactam, poly-11-amino undecanoic acid, bi(par-aminocyclohexyl)methane dodecanoamide, etc.

It is also possible to utilize polyamides prepared by copolymerization of two or more of the above acids and amines or terpolymerization of the above acids and amines. For example, a suitable polyamide is an adipic acid or isophthalic acid, hexamethylene diamine copolymer. Other copolymers include nylon-6/nylon-66 and nylon-6/nylon-12.

The polyamides which generally have a number average molecular weight of at least about 200 up to about 30,000 although in one embodiment, it is preferred to utilize polyamides having a number average molecular weight of at least 5000. The melting points of the useful polyamides range from about 150° C. to about 280° C. It is preferred to utilize polyamides which are linear polymers with a melting point in excess of about 200° C. In addition to the use of copolymers, the blended polymer compositions of the present invention may also contain a mixture of two or more of the above-described polyamides.

Other additives may be included in the polymer composition. For example, stabilizers and inhibitors of oxidative, thermal and ultraviolet light degradation may be included in the polymer blends as well as lubricants and mold release agents, colorants including dyes and pigments, nucleating agents, plasticizers, etc., may be included in the polymer blends.

The stabilizers can be incorporated into the composition at any stage in the preparation of the polymer blends, and preferably, the stabilizers are included early to preclude the initiation of degradation before the composition can be protected. The oxidative and thermal stabilizers useful in the polymer blends of the present invention include those used in addition polymers generally. They include, for example, up to about 1% by weight, based on the weight of the polymer blend, of Group 1 metal halides such as sodium, potassium, lithium and cuprous halides (e.g., chloride, bromide, and iodide), hindered phenols, hydroquinones, and various substituted derivatives of these materials and combinations thereof.

The ultraviolet light stabilizers may be included in amounts of up to about 2% by weight based on the weight of the polymer blend. Examples of ultraviolet light stabilizers include various substituted resorcinols, salicylates, benzotriazoles, benzophenones, etc.

Suitable lubricants and mold release agents may be included in amounts of up to about 1% by weight based on the weight of the polymer blend include materials such as stearic acid, stearic alcohol, stearamides, euracamide, organic dies such as nigrosine, pigments such as titanium dioxide, cadmium sulfide, carbon black, etc. The plasticizers which may be included in amounts of up to about 20% by weight based on the weight of the polymer blend include materials such as dioctylphthalate, bibenzylphthalate, butylbenzophthalate, hydrocarbon oils, sulfonamides such as paratoluene ethyl sulfonamides, etc.

The blended polymer compositions of the present invention including (A) the polyolefin, (B) the reaction product of the polyolefin and the alpha, beta unsaturated carboxylic acid reagent, and (C) the calcium carbonate and the other optional additives may be prepared by techniques well known to those skilled in the art. For example, a particularly useful procedure is to intimately mix the polymers using conventional mixing equipment such as a mill, a Banbury mixer, a Brabender Torque Rheometer, a single or twin screw extruder, continuous mixers, kneaders, etc. For example, the polymers may be intimately mixed in the form of granules and/or powder in a high shear mixer. One preferred process for preparing the blended polymers utilizes the Farrel Continuous Mixer (FCM CP-23). Short residence times and high shear are readily obtained in a CP-23. "Intimate" mixing means that the mixture is prepared with sufficient mechanical shear and thermal energy to produce a dispersed phase which is finely divided and homogeneously dispersed in the continuous or principal phase.

The blended polymer compositions of the present invention may be processed into shaped articles by extrusion, coextrusion, thermoforming, blow-molding, injection-molding, compression-molding, calendering, laminating, stamping, pultrusion, etc. In particular, shaped articles may be prepared by thermoforming sheets of the blended polymer compositions of the present invention.

The following examples include examples of polyolefin compositions of the present invention. Unless otherwise stated the amounts are in parts by weight, the temperature is in degrees Celsius, and the pressure is atmospheric pressure. The Examples are provided as an illustration of the polyolefin compositions and are not intended to limit the invention,

Example 1

A polyolefin composition is prepared by introducing 59.8% by weight of polypropylene (Lyondell PP available from Lyondell Polymers Corp.), 7% by weight of Polybond 1002 (a maleated polypropylene available from BP Chemical Co.), 30% by weight of calcium carbonate, 1% erucamide, 2% by weight of Engage® 8100 (an ethylene octene copolymer available from Dow Chemical Co.), and 0.2% by weight of stabilizer into an extruder.

Example 2

A polyolefin composition is prepared by introducing 69.8% by weight of Lyondell PP, 7% by weight of Polybond 1002, 20% by weight of calcium carbonate, 1% erucamide, 2% by weight of Engage® 8100, and 0.2% by weight of stabilizer into an extruder.

Example 3

A polyolefin composition is prepared by introducing 20.8 parts by weight of 3 melt flow propylene homopolymer (Lyondell), 34 parts of a 12 melt flow propylene homopolymer (Lyondell), 12.5 parts Polybond 1002, 30 parts treated calcium carbonate (Supercoat), 0.5 parts calcium stearate, 1.5 parts FERROFLO lubricant (20% silicone modified high impact polystyrene, 2 parts polyolefin elastomer available from du Pont DOW elastomers, 1.5 parts stabilizer, 0.3 parts antistat agent, 2.25 parts colorant into an extruder.

The following table contains additional example of polyolefins compositions.

|  | 3 | 4 | 5 | 6 | 7 | 8 |
|---|---|---|---|---|---|---|
| Lyondell PP | 55 | 65 | 75 | 65 | 65 | 60 |
| Polybond 1002 | 12 | 9 | 5 | 7 | 8 | 11 |
| Calcium carbonate | 33 | 26 | 20 | 25.8 | 21.8 | 24.8 |
| Stabilizer | — | — | — | 0.2 | 0.2 | 0.2 |
| Euracamide | — | — | — | 1 | 1 | 1 |
| Engage 8100 | — | — | — | 1 | 4 | 3 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A polymer composition comprising (A) from about 35% to about 75% by weight of (i) at least one olefin homopolymer or olefin copolymer having a melt flow from about 1 to about 6 and (ii) at least one olefin homopolymer or olefin copolymer having a melt flow from about 8 to about 18, (B) from about 2% to about 12% by weight of at least one reaction product of an alpha, beta unsaturated carboxylic ester, acid, or anhydride and a polyolefin, and (C) from 5% to about 40% by weight of filler, and either (D) from about 1% to about 8% by weight of a copolymer of ethylene and an olefin, or (E) from about 1% to about 8% by weight of at least one polyamide, or (F) mixtures of (D) and (E).

2. The composition of claim 1 wherein the olefin homopolymer or olefin copolymer (A) has from 2 to 8 carbon atoms.

3. The composition of claim 1 wherein the olefin homopolymer or olefin copolymer (A) is selected from the group consisting of ethylene, propylene, and butylene, and combinations thereof.

4. The composition of claim 1 wherein the olefin homopolymer or olefin copolymer (A) is a polypropylene or a polypropylene-ethylene copolymer.

5. The composition of claim 1 wherein the olefin homopolymer or olefin copolymer (A) contains from about 20% to about 50% by weight of (i) and from about 50% to about 80% by weight of (ii).

6. The composition of claim 1 wherein the alpha, beta unsaturated carboxylic ester, acid or anhydride is selected from the group consisting of acrylic acids and esters, methacrylic acids and esters, and maleic acids, esters or anhydride.

7. The composition of claim 1 wherein (B) is a maleated polypropylene or a maleated propylene ethylene copolymer.

8. The composition of claim 1 wherein (B) is an acrylic acid or ester grafted polypropylene or ethylene-propylene copolymer.

9. The composition of claim 1 wherein the filler (C) is calcium carbonate.

10. A polymer composition comprising (A) from about 40% to about 70% by weight of at least one polypropylene or propylene-ethylene copolymer, (B) from about 2% to about 12% by weight of at least one reaction product of (i) an acrylic acid, acrylic ester, maleic acid or maleic anhydride and (ii) a polyolefin, and (C) from 15% to about 35% by weight of filler, and either (D) from about 1% to about 8% by weight of a copolymer of ethylene and an olefin, or (E) from about 1% to about 8% by weight of at least one polyamide, or (F) mixtures of (D) and (E).

11. The composition of claim 10 wherein the polypropylene or propylene-ethylene copolymer has from 2 to 8 carbon atoms.

12. The composition of claim 10 wherein (B) is a maleated polypropylene or a maleated propylene ethylene copolymer.

13. The composition of claim 10 wherein the filler (C) is calcium carbonate.

14. A polymer composition comprising (A) a combination of (i) a polypropylene or propylene copolymer having a melt flow from about 1.5 to about 4 and (ii) a polypropylene or propylene-ethylene copolymer having a melt flow from about 9 to about 14, (B) from about 2% to about 12% by weight of at least one reaction product of an alpha, beta unsaturated carboxylic acid, ester, or anhydride and a polyolefin, and (C) from 5% to about 40% by weight of filler, and either (D) from about 1% to about 8% by weight of a copolymer of ethylene and an olefin having from 6 to 10 carbon atoms, or (E) from about 1% to about 8% by weight of at least one nylon, or (F) mixtures of (D) and (E).

15. The composition of claim 14 wherein (A) has from 2 to 8 carbon atoms.

16. The composition of claim 14 wherein (A) contains from about 20% to about 50% by weight of (i) and from about 50% to about 80% by weight of (ii).

17. The composition of claim 14 wherein the alpha, beta unsaturated carboxylic ester, acid or anhydride is selected from the group consisting of acrylic acids and esters, methacrylic acids and esters, and maleic acids, esters or anhydride.

18. The composition of claim 14 wherein (B) is a maleated polypropylene or a maleated propylene ethylene copolymer.

19. The composition of claim 14 wherein the filler (C) is calcium carbonate.

20. A polymer article prepared from the polymer composition of claim 1.

21. A polymer article prepared from the polymer composition of claim 10.

22. A polymer article prepared from the polymer composition of claim 14.

* * * * *